June 8, 1937.  B. F. LAUKANDT  2,083,235

PIANO CLASS TEACHING KEYBOARD

Filed Feb. 6, 1933

Inventor:
Bernhard F. Laukandt

Patented June 8, 1937

2,083,235

UNITED STATES PATENT OFFICE 2,083,235

PIANO CLASS TEACHING KEYBOARD

Bernhard Frank Laukandt, Red Wing, Minn.

Application February 6, 1933, Serial No. 655,442

4 Claims. (Cl. 84—471)

This invention relates to an improvement in keyboards which may be used for teaching beginners the rudiments of music. It has for its object, first, to provide a convenient, light and portable instrument, especially adapted for school use, which may be used in place of a piano; an instrument which can conveniently be placed on any ordinary school desk for the use of pupils during their class instruction in music and which, like a violin, can be taken home by the pupils for practice in case they have no piano at their disposal. Second, to provide an instrument which not only has a keyboard but also is capable to produce all the tones corresponding to the keys of the keyboard, thereby enabling the teacher as well as the pupil, to tell instantly whether a right or a wrong key has been touched. Third, to provide an instrument which enables the pupil to play real melodies and chords, and thereby to stimulate the pupils' interest in the study of music.

With the foregoing and other important objects and advantages in view, the invention resides in the certain new and useful combination, construction and arrangement of parts, as will be hereinafter more fully described, set forth in the appended claims, and illustrated in the accompanying drawing in which:

Figure 1:
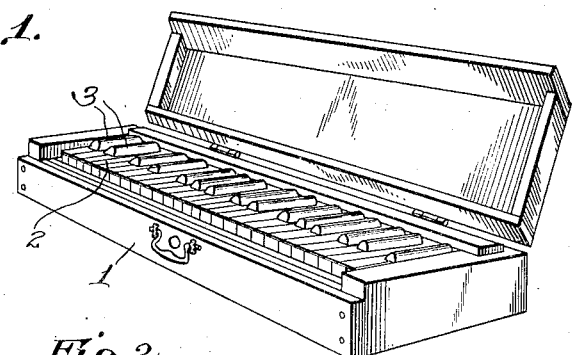
Figure 1 is a perspective front view, showing the general outer form of the complete instrument, which I will call "pianette".

Referring to the drawing, wherein similar characters of reference designate corresponding parts throughout the several views thereof, it will be noted that the upper part of the keyboard, i. e. the one exposed to view in Fig. 1 is of standard construction, having white, 2, and black, 3, keys in their usual arrangement according to the modern standard scale, and may extend to three or four octaves. The casing, 1, is characterized by its flatness or shallowness which renders it especially suited for use of the instrument on school desks, and for carrying it to and from the classroom.

Figure 2:
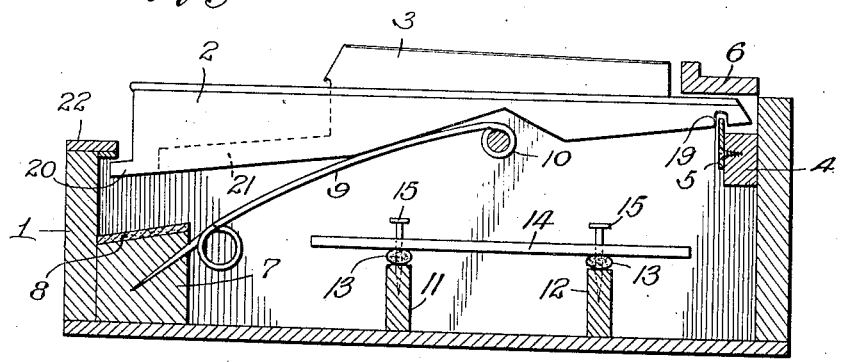
Figure 2 is a cross-section of the pianette or sounding keyboard, showing the arrangement of the inner parts.

A further distinguishing feature of my invention is the addition of a metallophone, consisting of two diverging rails, Fig. 2, 11 and 12, fastened to the bottom of the case, 1, a cushion of soft material, 13, covering the upper side of the rails, steel-bars, 14, cut according to a graduating scale, corresponding to the key or keys which are to set them into vibration, and pins, 15, holding these bars in place.

The bars are made to sound by the stroke of a small hammer, 18, located under each key and set in motion by the depression of the key; this hammer being an extension of the same spring, 9, which holds the key, 2, in its normal resting position, is formed by a coil which may be weighted by filling it with some heavy material. The rail, 7, to which the spring, 9, is fastened, is located in the extreme forepart of the inside of the casing, 1, extends throughout the full interior length of the casing, is covered on its upper side with a shock-absorbing soft material, 8, and serves to check the downward stroke of the keys. Because of the normal shortness of the black keys, an extension, Fig. 3, 21, has been added to their lower front end in order to make it possible for them to make contact with the checking-rail 7, Fig. 2, and thus, by obviating the necessity of a separate check-rail for the black keys, reserve as much space as possible under the keys for the proper placement of the metallophone, 14, Fig. 2.

All the white keys are provided with a similar, but a much shorter extension, Fig. 2, 20, at the base of their front end, which, by engaging the rail 22, prevents them from rising above their normal height.

The rear part of the keys is supported by the rail 4, Fig. 2, which, by means of a metal strip, 5, slightly extending above the upper side of the rail, 4, engages the groove, 19, on the lower side of the key, and thus prevents it from slipping forward or backward.

Above the rear part of the keys there is another rail, 6, fastened to each end of the casing, which holds the keys down to their supporting rail and also serves as a music-rack.

Figure 3:
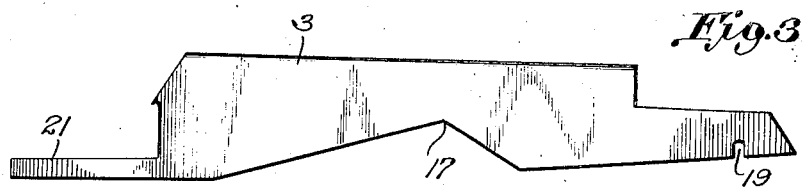
Figure 3 is a side view of one of the black or chromatic keys, showing the features in which it differs from an ordinary chromatic piano key.

In order to provide sufficient space for the stroke of the hammer, a somewhat triangular section, Fig. 3, 17, is cut out at the base of each key, thus allowing freer action for the hammer, 18, Fig. 2.

Figure 4:
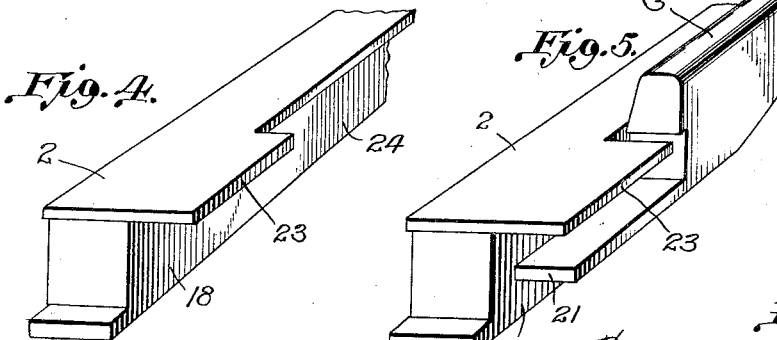
Figure 4 is a perspective view of one of the "white" keys, showing its peculiar shape by which it differs from the ordinary, so called white piano keys.

The extension, 21, Fig. 3, at the base of the black keys necessitates a reduction in the width of the head of the white keys. This is done by extending the main body, 24, Fig. 4, of the white keys, 2, to the front, giving them the same lateral dimension throughout, Fig. 4, 18, allowing the cover-plates, alone to retain their normal width, 23, which cover-plates, however, in my case, will be of substantial thickness, to enable them to stand the wear, even if only partly supported by the main body of the key.

Figure 5:
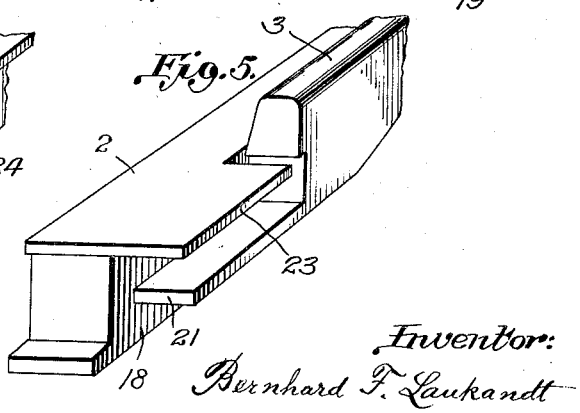
Figure 5 is also a perspective view of a "white" and a "black" key in combination, showing their interaction free from mutual interference.

How this reduction in the width of the forepart of the white keys removes all interference between the keys, is shown in Fig. 5, where 21 is the extension of the black key, 3, and 23 the overhanging cover-plate. Between these two there is enough space for the free action of both keys, and this applies to all adjacent keys in my sound-keyboard.

I am aware that prior to my invention, keyboards have been made; but they either are devoid of musical sound, or seem for other reasons unsuited for use in schoolrooms. What I claim as a novel feature, is:

1. A keyboard, the short or "black" keys of which have at the base of their outer end a bifurcated extension of sufficient length to make contact with the stop-rail under the outer end of the keys.

2. A keyboard, the long or "white" keys of which have at one or both sides of their broad outer end recesses, formed by the laterally overhanging coverplate and the body of the keys to provide the necessary space for the free up and down movement of the extension of the black keys and thus to eliminate interference of the movements of the black and white keys.

3. A keyboard, the white keys of which have at the sides of their broad outer end recesses and at the lower side of their outer end a groove for holding the key-supporting spring in place.

4. A keyboard having a stop-rail under the outer ends of the keys and a key-supporting spring the pointed end of which is anchored in the stop-rail and the free end of which rises at a slight angle to contact and support the key and extends rearward and in line with the key and having at its extreme end a coil suitable for holding a core of solid material, thus forming a hammer-head for striking the sound-bar below the key when the key is depressed, as stated in the specification.

BERNHARD FRANK LAUKANDT.